Oct. 25, 1966  G. B. REMMEY  3,280,769
PREHEATER FOR FURNACES
Filed March 17, 1964  3 Sheets-Sheet 2

INVENTOR.
GEORGE BICKLEY REMMEY
BY
*Busser, Smith & Harding*
ATTORNEYS

Oct. 25, 1966  G. B. REMMEY  3,280,769
PREHEATER FOR FURNACES
Filed March 17, 1964  3 Sheets-Sheet 3
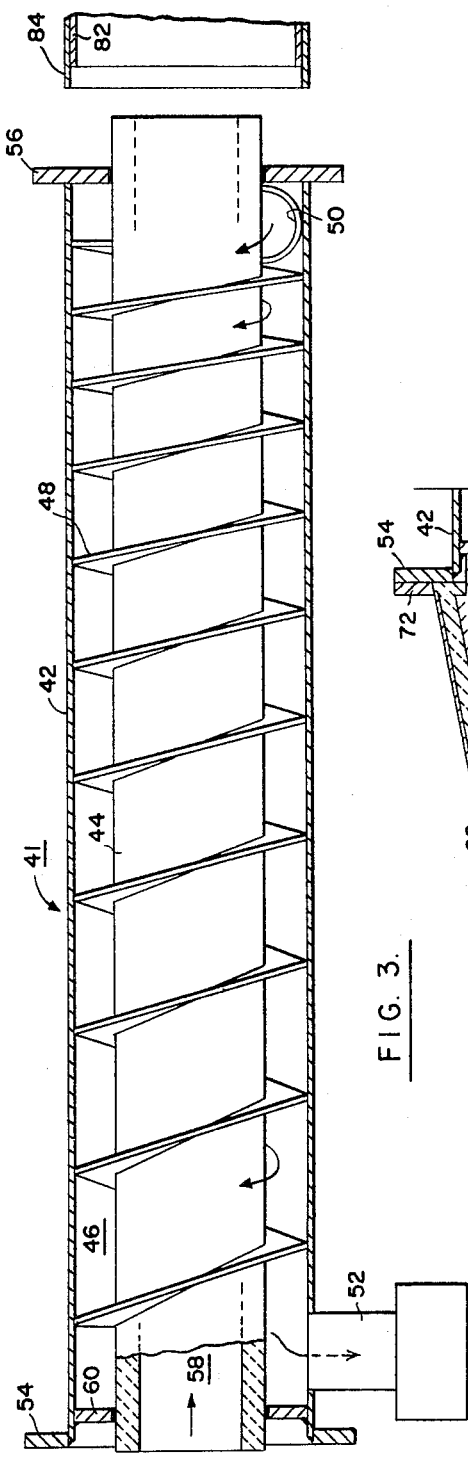
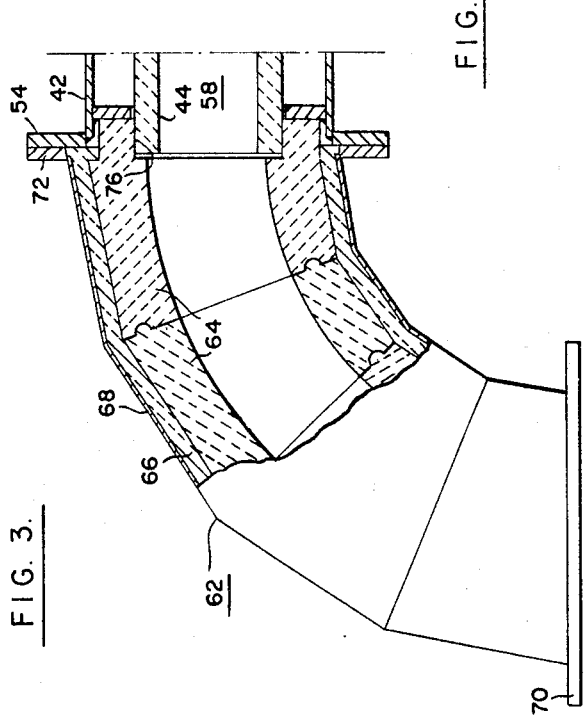
INVENTOR.
GEORGE BICKLEY REMMEY
BY
Busser, Smith + Harding
ATTORNEYS United States Patent Office 3,280,769
Patented Oct. 25, 1966

3,280,769
PREHEATER FOR FURNACES
George Bickley Remmey, Jenkintown, Pa., assignor to Bickley Furnaces Incorporated, Torresdale Manor, Pa., a corporation of Pennsylvania
Filed Mar. 17, 1964, Ser. No. 352,615
13 Claims. (Cl. 110—56)

This invention relates to preheaters for furnaces and, more particularly to apparatus for preheating the combustion air used by the furnace heating means or burners.

Many furnaces are fired by heating means which are supplied with preheated combustion air, such as many ceramic furnaces or kilns. Prior apparatus for preheating the combustion air have involved the use of a separate large preheating unit having its own source of heat and heat exchange means. Suitable pipe connections are provided between the preheating unit and the various heating means or burners of the furnace. However, these prior constructions have several disadvantages. They require the building of a large, bulky and separate air preheating furnace. The preheating furnace must be large enough to heat all the air for combustion and requires a large refractory flue for the heating gases. This flue is expensive because of the high temperature refractories required. These prior constructions also require expensive insulated alloy piping which runs to each furnace heating means. Since the preheated air temperature drops off very rapidly as the length of pipe increases, the temperature of the preheated air at the burners varies considerably. Moreover, in view of the remote location of the preheating furnace there is a considerable amount of heat loss in the various connecting pipes.

It is the general object of this invention to provide preheating apparatus for furnaces of the indicated type which apparatus overcomes the above-discussed disadvantages of present preheaters. The preheating apparatus in accordance with this invention is a compact and simple design and is an improvement over prior preheaters in that it requires less piping, it reduces the cost of the equipment required and it reduces the maintenance cost of the equipment. Moreover, the new preheating apparatus delivers higher temperature preheated air so that its temperature can be made equal at all burners. Briefly stated, the preheating apparatus in accordance with this invention achieves this objective by mounting a highly efficient preheating unit for each heating means on the furnace in the proximity of each furnace heating means, by utilizing the heated gases of the furnace for preheating the combustion air, and by controlling the flow through the preheater.

The above and other objects and features of the invention will apppear more fully from a consideration of the following detailed description in conjunction with the accompanying drawings wherein:

FIGURE 3 is a sectional view of the heat exchange unit in accordance with this invention;

FIGURE 4 is a sectional view of a detail; and

While the invention is applicable to various types of furnaces, it will be described in connection with a kiln such as that shown in FIGURES 1 and 2. This type of kiln is disclosed more fully in United States Patent No. 3,055,652. The kiln is indicated generally at 10 and is rectangular in form comprising a ceiling 12 for vertical walls 14, 16, 18 and 20 and a base 22. The ceiling and vertical walls comprise an inner layer of blocks of refractory material and a relatively thin outer shell of block insulation. The base comprises layers of refractory blocks as is described more fully in said patent. Accordingly, a substantially rectangular furnace heating chamber is defined by the refractory walls, this chamber being indicated in outline by the dotted lines in FIGURES 1 and 2. The kiln is provided with a suitable steel frame 24 for use in moving the kiln.

Figure 1:
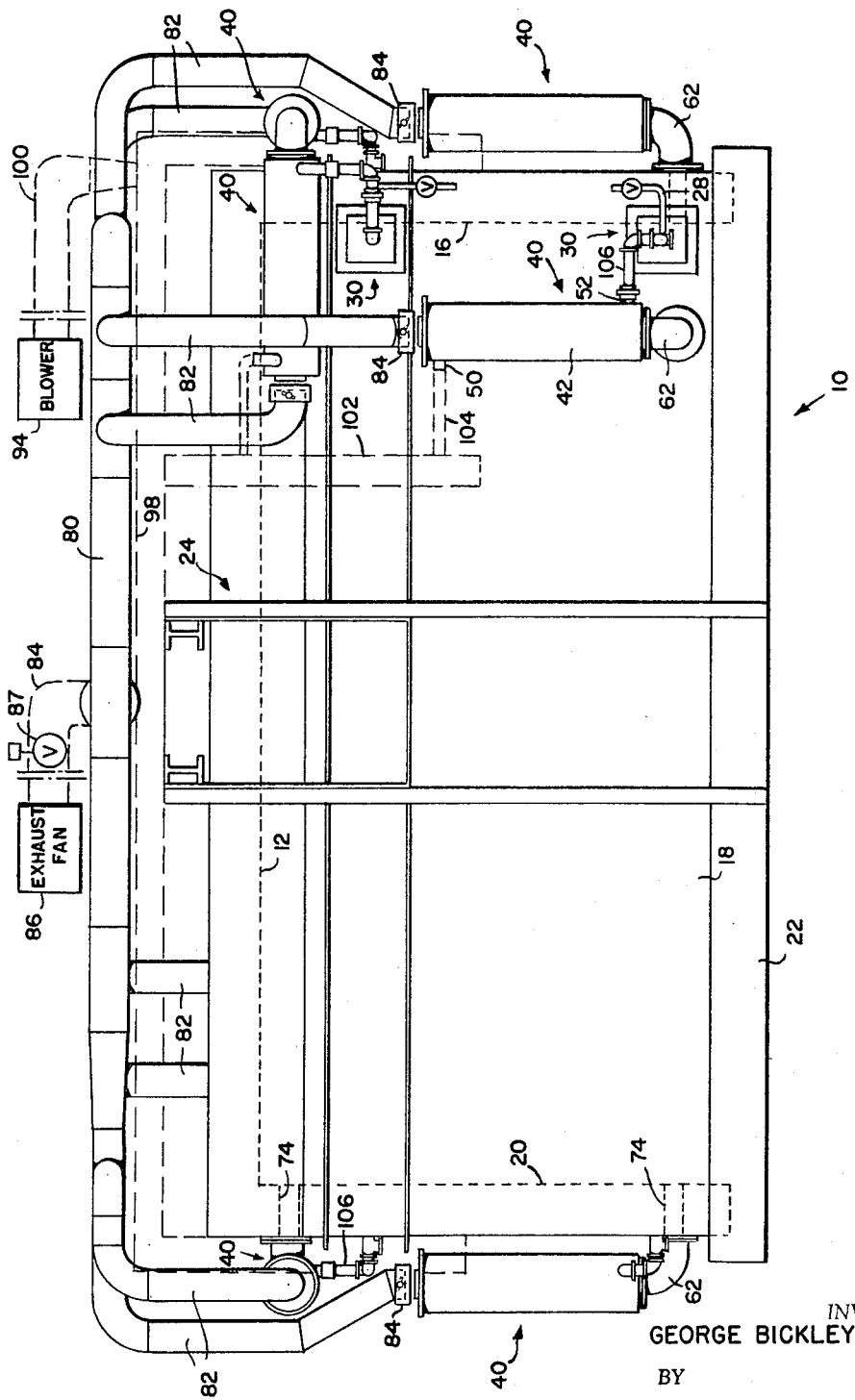
FIGURE 1 is a front elevation of a kiln constructed in accordance with this invention.
Figure 2:
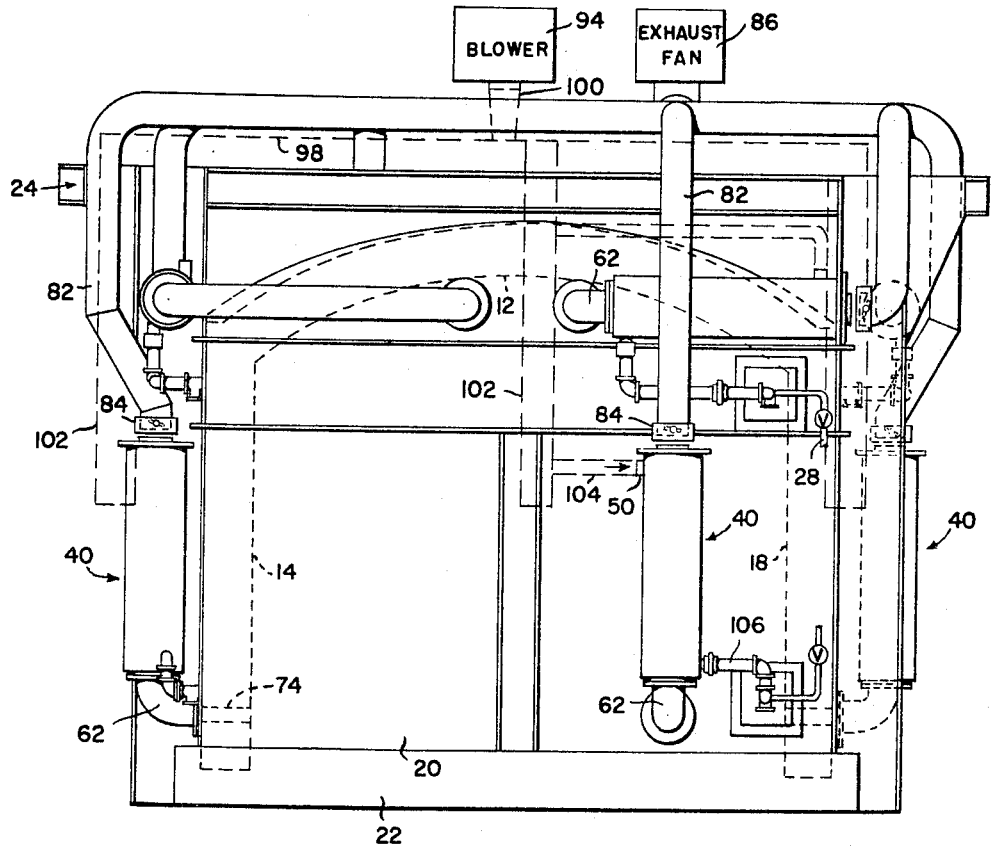
FIGURE 2 is a left end view of the kiln shown in FIGURE 1.

The kiln is provided with a plurality of burner assemblies 30 for heating the furnace chamber, the burner assemblies being mounted in the vertical walls of the kiln as is shown in FIGURES 1 and 2.

One layer of burner assemblies is circumferentially spaced about the vertical wall at the level of the lowermost portion of the ware to be heated. Another layer is provided at the upper end of the kiln. It will be apparent that the number of vertical layers of burner assemblies 30 is dependent upon the height of the kiln and the ware to be heated. In each layer, one of the burner assemblies 30 is positioned in each side of the vertical wall to direct a flame along an adjacent side. For example, the burner assemblies mounted in side 18 direct a flame along side 16, and the burner assemblies mounted in side 20 direct a flame along the side 18. By this arrangement, the burner assemblies may provide a gas stream completely encircling the ware as is more fully described in said prior patent. It is noted that the ware to be heated will be spaced from the kiln wall so that the gas stream issuing from the burner assemblies 30 will not directly contact any portion of the ware.

The burner assemblies may take various forms in accordance with this invention, such as for example, the burner assembly described in the copending application of Charles A. McFadden filed concurrently with this application. The type of burner assembly involved in accordance with this invention is one which is supplied with preheated combustion air. Of course, the burner assembly is also provided with a suitable fuel supply. The valve controlled fuel supply lines are indicated at 28 and are described more fully in said prior patent. While the invention will be described with burners using preheated combustion air, it will be apparent that it is applicable to other combustion gases.

In accordance with the present invention, a preheater assembly, indicated generally at 40, is provided for each of the burner assemblies 30. Each preheater assembly includes a heat exchanger 41 which is shown in detail in FIGURE 3 and comprises a metallic outer tube 42 and an inner tube 44 made of a suitable heat resistant refractory material such as silicon carbide. The inner tube 44 is positioned centrally within the outer tube 42 to define an annular chamber 46 therewith. A helical or spiral member 48 is positioned within this annular chamber 46 to define a helical heat exchange chamber as is apparent from FIGURE 3. As shown in FIGURE 3, the pitch of the helical member for each convolution becomes progressively larger in the direction of flow of the combustion air to be described hereafter. An inlet connection 50 and an outlet connection 52 are provided in the outer tube 42 to communicate with the annular chamber 46 at opposite ends of the heat exchanger 41. The heat exchanger 41 is provided with suitable mounting plates 54 and 56 at the ends thereof which will be provided with suitable gaskets when mounted. The inner tube 44 defines a longitudinally extending heat exchange chamber 58 therein. The helical member 48 is secured in position by spot welding it to the outer tube 42. The helical member 48 supports the inner tube 44 with a sliding fit and serves to centrally position the inner tube 44 within the outer tube 42. The plate 56 seals the inlet end of chamber 46 and an annular member 60 seals the outlet end, suitable refractory sealing material being employed to provide a tight seal in accordance with well known techniques.

The flow through the heat exchanger is indicated by the arrows in FIGURE 3. The heating gases flow to the right through chamber 58. The combustion air flows in a spiral path from right to left from the inlet 50 to the outlet 52.

It is noted that the heat exchanger in accordance with this invention involves a refractory inner tube 44 of high heat conductivity held in a shell consisting of the helical member 48 and outer tube 42 both of which are made of the same high temperature alloy. The helical member forms a duct in chamber 46 for directing the flow of combustion air from the inlet 50 to the outlet 52 around the hot silicon carbide tube 44. This arrangement greatly increases the length of air travel over the hot tube surface and causes the air to move at a high velocity. These two features provides a highly efficient heat exchanger. Moreover, the progressive increase in pitch of the helical member provides for expansion of the air because of the temperature rise thereof which reduces back pressure.

Conduit means are provided for connecting the chamber 58 within the inner tube 44 to the furnace chamber for the delivery of furnace gases to the heat exchanger. This means comprises a flue elbow 62 shown in detail in FIGURE 4. The elbow 62 is formed by a plurality of liner members 64 of refractory material and an outer liner 66 of insulation enclosed by an outer shell 68. Suitable annular flanges 70 and 72 are provided at the ends of the elbow for mounting the elbow to the furnace and the heat exchanger, respectively. The furnace is provided with passageways 74 communicating between the furnace chamber and the flue elbow 62. These passages are arranged as close to the heat exchanger as possible and to avoid direct contact with the gases passing into the furnace from the burner means. This can be done easily with a kiln having the firing system of said prior patent wherein the hot gases discharging from a burner must move all the way across the kiln wherefore ample time is provided for these hot gases to give up their available heat and to diffuse with the rest of the kiln gases before reaching the passageways 74. The liner member 64 which is to be positioned adjacent the heat exchanger is provided with a bore 76 adapted to receive the cooperating end of the inner tube 44 of the heat exchanger.

An exhaust system is provided for drawing the furnace gases through the heat exchanger. This system comprises an exhaust manifold 80 and connector lines 82 between the heat exchanger and the exhaust manifold. Each connector line 82 is provided with an intake duct 84 positioned adjacent the heat exchanger in alignment therewith and spaced slightly therefrom so that a quantity of ambient air is drawn into the line 82 in addition to the heat exchange gases to prevent overheating at this junction. The exhaust manifold 80 is connected by a duct 84 to a suitable exhaust fan indicated schematically at 86. Duct 84 is provided with an automatic valve for controlling the vacuum applied to the heat exchanger so that the amount of furnace gases drawn through the heat exchanger, and hence the amount of preheating, can be adjusted automatically. The automatic valve 87 may be connected to be responsive to the temperature of the hot air line for a representative burner.

The intake duct 84 for each heat exchanger is constructed so that the flow of furnace gases therethrough can be adjusted. Thus, the amount of furnace gases drawn through each heat exchanger can be adjusted to be equal whereby the preheated air delivered to each burner will have the same temperature. This is a highly desirable condition for good uniformity of temperature throughout the furnace.

Figure 5:
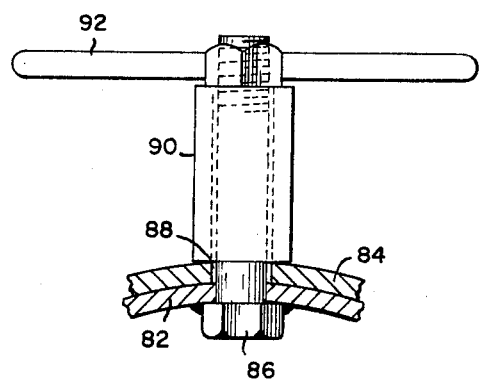
FIGURE 5 is a sectional view of another detail.

In order to regulate the flow of the furnace gases through the heat exchanger, the intake duct 84 is mounted on the end of the duct 82 for movement thereon toward and away from the discharge end of tube 44. The means for providing this adjustability are illustrated in FIGURE 5 and comprise a bolt 86 welded to duct 82 with the threaded end thereof projecting outwardly through an axially extending slot 88 in the intake duct 84. A sleeve 90 is positioned on the projecting portion of bolt 86 with a wing nut 92 threaded onto the end of bolt 86. It will thus be apparent that the wing nut and the sleeve may be tightened to hold frictionally the intake duct 84 in various longitudinal positions on the duct 82. In setting up the apparatus, the intake duct is first set with the desired spacing after which the wing nut is tightened to secure the intake duct 84 in position. It will be apparent that the closer the intake duct 84 is mounted to the discharge end of the tube 44, the greater the amount of suction applied to the heat exchanger and, accordingly, the greater the amount of furnace gases which are drawn through the heat exchanger.

A blower system is provided for supplying room temperature combustion air to the heat exchanger 40. For the sake of clarity in the drawings, the blower system is indicated in dashed lines in FIGURES 1 and 2. This system comprises a blower, indicated schematically at 96, connected to a manifold duct 98 by way of a duct 100. The manifold duct has connected thereto a plurality of branch ducts 102 for groups of the preheaters. Each preheater is provided with an inlet conduit 104 connected to the inlet connection 50. Accordingly, the blower system delivers room temperature air to each preheater by way of blower 94, duct 100, manifold duct 98, a branch duct 102 and an inlet connection 104. If desired, the inlet connections 104 may be provided with a valve for adjusting the flow therethrough.

Each preheater 40 is provided with a combustion air outlet conduit 106 for delivering combustion air from the preheater outlet connection 52 to the burner assembly 30. The connection to the burner assembly will vary in accordance with the particular burner construction. The burner assembly involved in said prior-mentioned application has the preheated air connected thereto by way of a simple pipe connection connected to the burner to direct the preheated air along the longitudinal axis thereof.

During the firing of the kiln, the burner assemblies 30 direct a heating gas stream into the furnace chamber as described above. Each burner assembly 30 is supplied with a suitable fuel and with preheated combustion air. The preheaters 40 operate to preheat the combustion air by a heat exchange action. Hot gases from the furnace are drawn through the chamber 58 of the inner tube 44 by the action of the exhaust system at the desired rate of flow. At the same time the blower system delivers combustion air through the heat exchangers by way of the inlet connection 50, the helical passage and the outlet connection 52. It is noted that the heating gases from the furnace and the heated combustion air flow in opposite directions whereby a more effective heat transfer takes place. The heat exchange relationship exists between the combustion air and the hot gases passing through the silicon carbide tube causing the temperature of the combustion air to be raised. The efficiency of the heat exchange is enhanced by reason of the helical flow which increases the length and area of the heat exchange path as discussed previously.

The use of a refractory tube in the heat exchanger serves to prolong the life thereof because of the durability of such a tube. Moreover, since the silicon carbide tube is not mounted in a permanent position, it is easily replaced when it becomes worn. It is a simple matter to slide the silicon carbide tube from the heat exchanger and replace it with a new tube.

It will be apparent that the construction in accordance with this invention minimizes the amount of piping that is necessary. By mounting the heat exchanger on the kiln adjacent the burner a very short length of piping between the heat exchanger and the burner is necessary. Also, a small refractory lined flue with a minimum duct length may be used to direct heat directly from the kiln to the preheater. This flue is relatively inexpensive.

Another feature of the invention is the arrangement whereby the silicon carbide tube is located centrally within the alloy shell. This tube is capable of withstanding the high temperature of the gases, which may be as high as 3300° F., because of the high velocity air which is passing around all parts of the tube to lower the mean temperature thereof below a temperature which would be destructive. Accordingly, these tubes have a long life. Moreover, since the air separates and protects the alloy parts from the hot silicon carbide tube, it is safe to manufacture the spiral member and the shell of alloys that can stand the temperatures involved and give a long service life. Moreover, with this arrangement the insulation on the outside of the shell can be kept to a minimum.

Another feature of the invention is that maintenance costs and inspection required are greatly reduced because the design provides for adequate cooling by the preheated air of all metal parts and means for adjusting the temperature on the silicon carbide tube prevents the possibility of it reaching an excessive temperature. Moreover, as discussed above, the arrangement involves the use of only one expendible part, the silicon carbide tube, which can be replaced readily without disassemblying the entire heat exchanger.

It will be apparent that various changes may be made in the construction and arrangement of parts without departing from the scope of the invention wherefore it is not desired to be limited except as set forth by the following claims.

What is claimed is:

1. A furnace comprising a heating chamber, a burner means directing a heating gas into said heating chamber and using a preheated combustion gas, a heat exchanger mounted on the furnace adjacent the burner means, said heat exchanger including an outer tube of a high temperature alloy, an inner tube of a high temperature refractory mounted centrally within said outer tube, a first heat exchange chamber formed in the space between said inner and outer tubes, a second heat exchange chamber within said inner tube in heat exchange relationship with said first heat exchange chamber, and a member of a high temperature alloy extending helically through said first chamber to provide a helical heating flow path through said first chamber, said member being secured to said outer tube and supporting said inner tube loosely so that said inner tube may be inserted and removed from its position by a sliding movement, means connecting one end of said second chamber to the furnace heating chamber, means connecting one end of said first chamber to said burner means, and means for delivering a supply of combustion gas to the other end of said first chamber.

2. A furnace comprising wall means defining a heating chamber, a burner means directing a heating gas into said heating chamber and using a preheated combustion gas, a heat exchanger mounted on said wall means adjacent the burner means, said heat exchanger including an outer tube, an inner tube mounted centrally within said outer tube, a first heat exchange chamber formed in the space between said inner and outer tubes, a second heat exchange chamber within said inner tube in heat exchange relationship with said first heat exchange chamber, and a member extending helically through said first chamber to provide a helical flow path through said first chamber, a short refractory lined elbow connecting one end of said second chamber to the furnace heating chamber, said elbow being adapted to receive one end of said inner tube therein, means connecting one of said first chamber to said burner means, and means for delivering a supply of combustion gas to the other end of said first chamber.

3. A furnace comprising wall means defining a heating chamber therein, a plurality of burner assemblies mounted on said wall means to direct heating gas streams into the furnace heating chamber, said burner assemblies being adapted for operation with preheated combustion gas, a plurality of preheaters for supplying preheated combustion gas to said burner assemblies, there being a preheater individually associated with each of said burner assemblies, each preheater being mounted on the furnace adjacent its associated burner assembly, each of said preheaters including a heat exchanger adapted to be mounted on the furnace adjacent the burner means, said heat exchanger including an outer tube, an inner tube mounted centrally within said outer tube, a first heat exchange chamber formed in the space between said inner and outer tubes, a second heat exchange chamber within said inner tube in heat exchange relationship in said first heat exchange chamber, and a member extending helically through said first chamber to provide a helical heating flow path through said first chamber, means for directing hot gas from said furnace heating chamber through said second heat exchange chamber, and means for directing a supply of combustion gas through said first chamber to the adjacent burner assembly.

4. A furnace according to claim 3 wherein said means for directing said hot gas includes a flue connection between said furnace heating chamber and one end of each of said inner tubes, an exhaust system having a plurality of conduits applying a suction to the other end of each of said inner tubes.

5. A furnace according to claim 4 including means on each of said conduits for adjusting the suction applied to the corresponding inner tube.

6. A furnace according to claim 5 wherein each said adjusting means comprises a member spaced from its corresponding inner tube and mounted for movement toward and away from said corresponding inner tube to vary the suction applied thereto.

7. A furnace according to claim 4 wherein said means for directing combustion gas includes a blower and conduit means for connecting said blower to supply combustion gas to one end of each of said second heat exchange chambers and the other end of said second heat exchange chambers to the adjacent burner assembly.

8. A furnace comprising wall means defining a heating chamber therein, a plurality of burner assemblies mounted on said wall means to direct heating gas streams into the furnace heating chamber, said burner assemblies being adapted for operation with preheated combustion gas, a plurality of preheaters for supplying preheated combustion gas to said burner assemblies, there being a preheater for each of said burner assemblies, each preheated being mounted on the furnace adjacent its cooperating burner assembly, each of said preheaters including a heat exchanger adapted to be mounted on the furnace adjacent the burner means, said heat exchanger including an outer tube, an inner tube mounted centrally within said outer tube, a first heat exchange chamber formed in the space between said inner and outer tubes, a second heat exchange chamber within said inner tube in heat exchange relationship with said first heat exchange chamber, and a member extending helically through said first chamber to provide a helical heating flow path through said first chamber, means for directing hot gas from said furnace heating chamber through said second heat exchange chamber, and means for directing a supply of combustion gas through said first chamber to the adjacent burner assembly, said means for directing combustion gas including a blower and conduit means for connecting said blower to supply combustion gas to one end of each of said second heat exchange chambers and the other end of said second heat exchange chambers to the adjacent burner assembly.

9. A furnace comprising wall means defining a heating chamber therein, a plurality of burner assemblies mounted on said wall means to direct heating gas streams into the furnace heating chamber, said burner assemblies being adapted for operation with preheated combustion gas, a plurality of preheaters for supplying preheated combustion gas to said burner assemblies, there being a preheater for each of said burner assemblies, each preheater being mounted on the furnace adjacent its cooperating burner assembly, each of said preheaters including a heat exchanger adapted to be mounted on the furnace adjacent the burner means, said heat exchanger including an outer tube, an inner tube mounted contrally within said outer tube, a first heat exchange chamber formed in the space between said inner and outer tubes, a second heat exchange chamber within said inner tube in heat exchange relationship with said first heat exchange chamber, and a member extending helically through said first chamber to provide a helical heating flow path through said first chamber, the spacing between opposed portions of said member increasing progressively from one end thereof to the other, means for directing hot gas from said furnace heating chamber through said second heat exchange chamber, and means for directing a supply of combustion gas through said first chamber to the adjacent burner assembly.

10. A furnace comprising wall means defining a heating chamber therein, a plurality of burner assemblies mounted on said wall means to direct heating gas streams into the furnace heating chamber, said burner assemblies being adapted for operation with preheated combustion gas, a plurality of preheaters for supplying preheated combustion gas to said burner assemblies, each of said preheaters being individually associated with one of said burner assemblies for individually preheating the combustion gas for the associated burner assembly, each of said preheaters including a first heat exchange chamber for the heating gases and a second heat exchange chamber for the heated gases, said chambers being arranged in heat exchange relationship, means for supplying heating gas to said first chamber, means for supplying burner combustion gas to said second chamber whereby the combustion gas is heated by said heating gas, and means for connecting the second chamber of each of said individual preheaters to the burner assembly associated therewith for delivering preheated combustion gas thereto, each preheater being mounted on the furnace in proximity with its associated burner assembly whereby the length of each preheater connection to the associated burned assembly is relatively short.

11. A furnace according to claim 10 wherein there is provided a plurality of said burner assemblies at each of two vertically spaced layers, the burner assemblies in each layer being spaced relative to one another to direct their gas streams into the furnace heating chamber at spaced locations.

12. A furnace comprising wall means defining a heating chamber therein, a plurality of burner assemblies mounted on said wall means to direct heating gas streams into the furnace heating chamber, said burner assemblies being adapted for operation with preheated combustion gas, a plurality of preheaters for supplying preheated combustion gas to said burner assemblies each of said preheaters being individually associated with one of said burner assemblies for preheating the combustion gas for the associated burner assembly, each preheater being mounted on the furnace closely adjacent its associated burner assembly, each of said preheaters including a first heat exchange chamber, including an inner tube, for the heating gases and a second heat exchange chamber, including an outer tube around said inner tube for the heated gases, said chambers being arranged in heat exchange relationship, means for supplying heating gas directly from said furnace heating chamber to said inner tube of said first chamber, means for supplying combustion gas to said outer tube of said second chamber whereby said combustion gas is heated by said heating gas, and means for connecting the second chamber of each of said individual preheaters to the burner assembly associated therewith for delivering preheated combustion gas thereto.

13. A furnace according to claim 12 wherein there is provided a plurality of said burner assemblies at each of two vertically spaced layers, the burner assemblies in each layer being spaced relative to one another to direct their gas streams into the furnace heating chambers at spaced locations, said means for supplying heating gas from the furnace heating chamber being connected thereto at locations proximate to the burner assembly associated with the preheater to be supplied, whereby the length of each connection between the furnace chamber and a preheater is relatively short.

References Cited by the Examiner

UNITED STATES PATENTS

| 2,152,546 | 3/1939 | Fitch | 263—20 |
| 2,514,084 | 7/1950 | Mowat | 263—20 |
| 2,689,722 | 9/1954 | Knight | 263—20 |
| 2,742,269 | 4/1956 | Schefels et al. | 165—156 X |

FOREIGN PATENTS

| 93,200 | 4/1962 | Denmark. |

KENNETH W. SPRAGUE, *Primary Examiner.*